No. 656,352. Patented Aug. 21, 1900.
W. HOLMES.
BASIN STOPPER.
(Application filed Jan. 31, 1900.)
(No Model.)
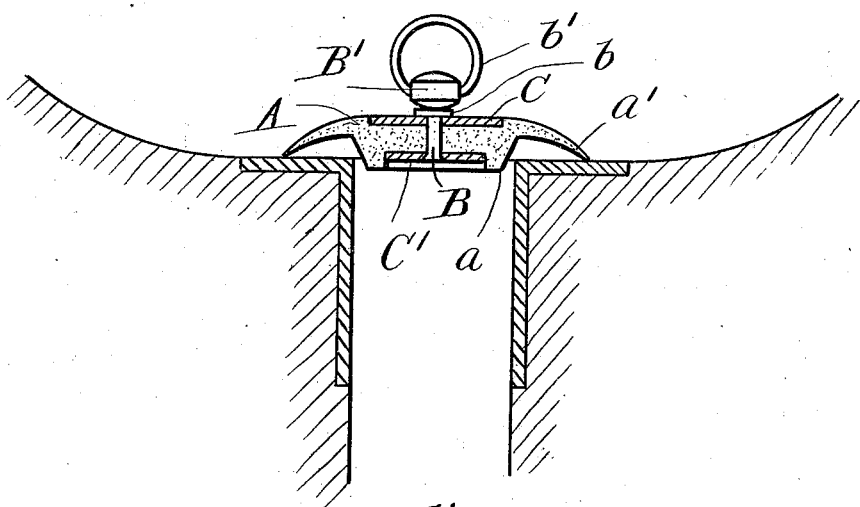
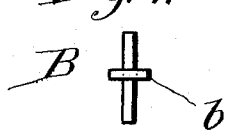
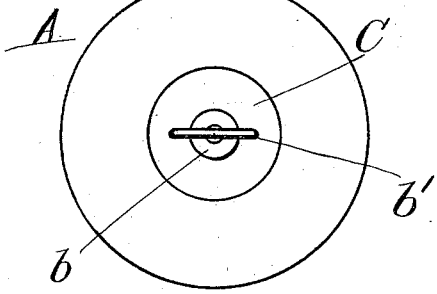
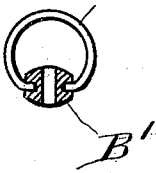
Witnesses:
A. F. Durand
Agnes A. Devine
Inventor:
William Holmes
by Chas L. Page Atty.
THE NORRIS PETERS CO., PHOTO-LITHO., WASHINGTON, D. C.

UNITED STATES PATENT OFFICE.

WILLIAM HOLMES, OF CHICAGO, ILLINOIS, ASSIGNOR TO THE MORGAN & WRIGHT, OF SAME PLACE.

BASIN-STOPPER.

SPECIFICATION forming part of Letters Patent No. 656,352, dated August 21, 1900.

Application filed January 31, 1900. Serial No. 3,396. (No model.)

*To all whom it may concern:*

Be it known that I, WILLIAM HOLMES, a citizen of the United States, residing at Chicago, county of Cook, State of Illinois, have invented a certain new and useful Improvement in Basin-Stoppers, of which the following is a specification.

My invention contemplates a basin-stopper having a flexible rubber flange which is dished on its under side. The stopper is also provided with a tapered plug portion or boss, which is preferably of rubber and molded integral with said flange. In use the tapered plug portion or boss of the stopper projects within the orifice or outlet at the bottom of the basin, and the edge of the flexible rubber flange rests upon the surface surrounding such outlet. The said boss is preferably of a size to fit loosely within the said orifice, the stopper in this way resting only upon its flange and the flexibility of the flange permitting it to yield as the pressure of the water increases. In this way the extent of contact between the basin and the under surface of the flange varies according to the quantity of water in the basin. When the basin is full and the pressure is comparatively great, the stopper is depressed until all, or at least a greater portion, of the under surface of the flange, according to its flexibility, is in contact with the basin; but with a small quantity of water and a corresponding degree of pressure only the extreme edge or edge portion of the flange is thus in contact and the stopper retains its normal or approximately-normal shape. It will be seen, therefore, that with my improved stopper the effectiveness of the closure increases with the pressure of the water.

Other features and advantages will hereinafter more fully appear.

In the accompanying drawings, Figure 1 illustrates a basin-stopper embodying the principles of my invention, the stopper being shown in central vertical section, and the view also illustrating the manner in which the stopper is applied to a basin outlet or orifice. Fig. 2 is a plan of the basin-stopper shown in Fig. 1. Fig. 3 is a vertical section of the rubber portion of the stopper. Fig. 4 is a view of the shouldered post or pin which is secured centrally to the stopper. Fig. 5 is a view of the head or collar which is rotatably mounted upon the said stem or post.

The rubber stopper A can be molded in one piece and is preferably formed with a boss or plug portion $a$ and a flange $a'$. The said boss or plug portion is tapering in form, and the flange, which, it will be observed, projects laterally from the upper portion of the boss, is thin and flexible and dished on its under side. Thus formed the stopper has an upper surface which is more or less convex and an under surface which is concave, such concave lower surface being provided with a central protuberance or boss. This central protuberance or boss is preferably of a size to fit loosely within the basin-outlet and serves as a sort of guide for centering the stopper over said outlet.

The stopper can be attached in any suitable manner to the usual chain or cord; but as a matter of further and special improvement I provide the stopper with a stem or post B. The said stem or post is provided with a shoulder $b$ and has a head or collar B' rotatably mounted upon its upper end. The stopper can be molded with upper and lower countersinks $a^2$ and $a^3$ and also with a central opening $a^4$, the said countersinks providing seats for a couple of metal plates C and C'. These plates are provided with central openings which register with the opening $a^4$, and the lower portion of the said stem or post is extended through these openings and has its lower end upset or riveted over, as shown in Fig. 1. In this way the stem or post is firmly secured to the stopper, the shoulder $b$ bearing against the upper plate C and the central portion of the rubber being clamped tightly between this plate and the lower one C'. The head or collar B' is retained upon the said stem or post by upsetting or riveting over the latter's upper end. Said head or collar may be provided with a ring $b'$, and the chain or cord can be secured to this ring in any suitable manner.

Thus formed and constructed the stopper is adapted to close the usual outlet-opening at the bottom of the bowl or basin. When adjusted into place, the tapering boss $a$ projects within the said opening, as shown in Fig. 1, and the edge of the flange $a'$ bears upon the surface surrounding such opening. The flexibility of this flange permits the stopper to settle as the pressure of the water increases, and in this way the extent of contact between the under surface of the flange increases as the bowl is filled. By reason of the dished formation of the flange its edges are held firmly in contact with the basin, and for this reason the flange is not liable to curl up and cause leakage. The rotatable head or collar B' permits the stopper to turn freely at the end of the cord or chain, and in this way twisting of the latter is avoided.

What I claim as my invention is—

A rubber basin-stopper molded with a boss adapted to project within the basin-outlet and a thin, flexible flange dished on its under side and adapted to bear upon the surface surrounding said opening, two metal plates arranged at top and bottom of said rubber stopper, a stem or post extending through said plates and the intervening rubber and having a shoulder which bears upon the upper plate, a collar or head rotatably secured upon the upper portion of said stem or post, and a ring secured to said collar or head, substantially as and for the purpose set forth.

WILLIAM HOLMES.

Witnesses:
ARTHUR F. DURAND,
AGNES A. DEVINE.